United States Patent
Masuda

(10) Patent No.: US 7,754,792 B2
(45) Date of Patent: Jul. 13, 2010

(54) FLAME-RETARDANT POLYESTER ARTIFICIAL HAIR

(75) Inventor: Toshiyuki Masuda, Takasago (JP)

(73) Assignee: Kaneka Corporation, Osaka (JP)

( * ) Notice: Subject to any disclaimer, the term of this patent is extended or adjusted under 35 U.S.C. 154(b) by 34 days.

(21) Appl. No.: 10/592,393

(22) PCT Filed: Apr. 8, 2005

(86) PCT No.: PCT/JP2005/006968

§ 371 (c)(1),
(2), (4) Date: Oct. 11, 2006

(87) PCT Pub. No.: WO2005/100650

PCT Pub. Date: Oct. 27, 2005

(65) Prior Publication Data

US 2008/0085957 A1 Apr. 10, 2008

(30) Foreign Application Priority Data

Apr. 13, 2004 (JP) .............................. 2004-118210

(51) Int. Cl.
*C08K 5/49* (2006.01)
(52) U.S. Cl. ........................................ 524/117; 524/94
(58) Field of Classification Search .................... 521/90; 528/272; 524/373, 119, 117
See application file for complete search history.

(56) References Cited

U.S. PATENT DOCUMENTS 3,941,752 A 3/1976 Kleiner et al.
4,001,367 A * 1/1977 Guthrie et al. .............. 264/154

(Continued)

FOREIGN PATENT DOCUMENTS

CA 2019313 12/1990
EP 1479798 A1 * 11/2004

(Continued)

OTHER PUBLICATIONS

Derwent abstract of JP 60042391 A, Mar. 6, 1985, Saito et al.*

(Continued)

*Primary Examiner*—Vasu Jagannathan
*Assistant Examiner*—Doris L Lee
(74) *Attorney, Agent, or Firm*—Hamre, Schumann, Mueller & Larson, P.C.

(57) ABSTRACT

It is an object of the present invention to provide a polyester based artificial hair which has excellent setting properties, feeling and transparency and further has excellent flame-retardancy and controlled gloss of fiber surface while maintaining fiber properties possessed by a conventional polyester fiber such as heat resistance, strength and elongation and the like. The flame retardant polyester based artificial hair which has excellent setting properties, feeling and transparency and further has excellent flame-retardancy and controlled gloss of fiber surface while maintaining fiber properties possessed by a conventional polyester fiber such as heat resistance, strength and elongation and the like can be obtained by melt spinning a composition comprising a polyester, at least one bromine containing flame-retardant selected from the group consisting of a brominated epoxy based flame-retardant, a brominated phenoxy resin based flame-retardant and a brominated phosphate based flame-retardant and a phosphorus compound selected from an organic cyclic phosphorus compound and/or a phosphoric ester amide compound and optionally, the composition further comprises organic fine particles and/or inorganic fine particles.

11 Claims, 1 Drawing Sheet

U.S. PATENT DOCUMENTS

| | | | |
|---|---|---|---|
| 4,317,769 A | | 3/1982 | Saito et al. |
| 4,732,921 A | * | 3/1988 | Hochberg et al. ........... 523/460 |
| 4,801,405 A | | 1/1989 | Yamada et al. |
| 7,435,769 B2 | * | 10/2008 | Kishimoto et al. ............ 524/94 |
| 2001/0044488 A1 | * | 11/2001 | Yasuda et al. ................ 524/341 |

FOREIGN PATENT DOCUMENTS

| | | | |
|---|---|---|---|
| JP | 53-13479 | | 5/1978 |
| JP | 53-56250 | * | 5/1978 |
| JP | 55-41610 B2 | | 10/1980 |
| JP | 56-104949 A | | 8/1981 |
| JP | 60042391 A | * | 3/1985 |
| JP | 60-71713 | * | 4/1985 |
| JP | 1-24913 B2 | | 5/1989 |
| JP | 3-27105 | | 2/1991 |
| JP | 3-57990 B2 | | 9/1991 |
| JP | 4-14132 B2 | | 3/1992 |
| JP | 5-279921 A | | 10/1993 |
| JP | 11-124732 A | | 5/1999 |
| JP | 2000-303256 A | | 10/2000 |
| JP | 2001-139823 | * | 5/2001 |
| JP | 2003-221733 A | | 8/2003 |
| JP | 2003-238580 A | | 8/2003 |
| JP | 2003-313724 A | | 11/2003 |
| JP | 2005-68576 A | | 3/2005 |
| JP | 2005-120533 A | | 5/2005 |
| WO | WO 03/071014 | * | 8/2003 |
| WO | WO 2004/085537 | * | 10/2004 |

OTHER PUBLICATIONS

Translation of Saito, JP 60-042391.*
Translation of Endo, JP 53-56250.*
Translation of JP 2001-139823.*
Iizaka et al, Derwent Abstract of JP 60-71713, Jun. 1985.*

* cited by examiner

FLAME-RETARDANT POLYESTER ARTIFICIAL HAIR

This application is a nationalization of PCT application PCT/JP2005/006968 filed on Apr. 8, 2005 claiming priority to Japanese Application No. 2004-118210 filed on Apr. 13, 2004, the contents of which are incorporated herein by reference in their entirety.

TECHNICAL FIELD

The present invention relates to a flame retardant polyester based artificial hair, formed from a composition comprising a polyester, a specific flame-retardant containing bromine and a specific flame-retardant containing phosphorous. The present invention also relates to a flame retardant polyester based artificial hair, formed from a composition further comprising organic fine particles and/or inorganic fine particles. More particularly, the present invention relates to a flame retardant polyester based artificial hair which has excellent setting properties, feeling and transparency while maintaining fiber properties such as heat resistance, strength and elongation and the like.

BACKGROUND ART

Fibers made of polyethylene terephthalate or a polyester comprising polyethylene terephthalate as a main component have a high melting point, a high modulus of elasticity, excellent heat resistance and chemical resistance. Thus, they are widely used in curtains, carpets, clothes, blankets, sheetings, table clothes, upholstery fabrics, wall coverings, artificial hair, interior materials for automobiles, outdoor reinforcing materials, and safety nets.

With respect to hair products such as wigs, hair wigs, extensions, hair bands, and doll hair, it is conventional to use human hair or artificial hair (modacrylic fibers, polyvinyl chloride fibers) or the like. However, because it has now become difficult to obtain human hair, artificial hair has become more important. Artificial hair is often made of modacrylic fibers because of their flame retardance, but they have insufficient heat resistance.

In recent years there has been proposed, as a main component for artificial hair, a polyester typified by polyethylene terephthalate which has excellent heat resistance. However, when using a polyester as an artificial hair material it has become necessary to add a flame-retardant property in view of safety. Since conventional polyester fibers are flammable, various attempts have been made to improve the flame resistance of polyester fibers. Known examples include using a fiber made of a polyester obtained by copolymerizing a flame retardant monomer containing a phosphorus atom. Known examples also include adding a flame retardant to a polyester fiber.

Several methods have been proposed which involve copolymerizing a flame retardant monomer. Copolymerizing a phosphorus compound with excellent heat stability having a phosphorus atom as a ring member is disclosed in Japanese Patent Publication No. 55-41610, copolymerizing carboxyphosphinic acid is disclosed in Japanese Patent Publication No. 53-13479, and copolymerizing or adding a phosphorus compound to a polyester containing a polyarylate is disclosed in Japanese Laid-open Patent No. 11-124732. As artificial hair to which flame retardant technology is applied, a polyester fiber copolymerized with a phosphorus compound has been proposed in Japanese Laid-open Patent No. 03-27105, for example. However, since artificial hair is required to be highly flame resistant, the copolymer polyester fiber used for artificial hair must have a high copolymerization amount. This results in a significant decrease in heat resistance of the polyester, and causes other problems which make it difficult to perform melt spinning. Also, when exposed to a flame, the artificial hair does not catch fire and burn, but becomes molten and drips.

With respect to a method which involves adding a flame retardant, it has been proposed to add a halogenated cycloalkane compound as fine particles to a polyester fiber, as disclosed in Japanese Patent Publication No. 03-57990, or add a bromine-containing alkylcyclohexane to a polyester fiber, as disclosed in Japanese Patent Publication No. 01-24913. However, in the method which involves adding a flame retardant to a polyester fiber, in order to achieve sufficient flame retardancy the addition treatment temperature must be as high as 150° C. or more, the addition treatment time must be long, or a large amount of a flame retardant must be used. This causes problems such as deteriorated fiber properties, reduced productivity and an increased production cost.

As described above, artificial hair fiber which maintains fiber properties possessed by a conventional polyester fiber such as heat resistance, strength and elongation and the like, and also has excellent setting properties and flame retardance, has not yet been produced.

DESCRIPTION OF THE INVENTION

An object of the present invention is to provide a flame retardant polyester based artificial hair which maintains fiber properties possessed by a conventional polyester fiber such as heat resistance, strength and elongation and the like and has excellent setting properties, feelings, transparency and flame retardance and also has adjusted gloss on the surface of fibers, by solving the above-described existing problems.

In order to solve the above-described problems, the inventors have conducted intensive studies. They have found that a flame retardant polyester based artificial hair which maintains fiber properties such as heat resistance, strength and elongation and the like possessed by a conventional polyester fiber and has excellent setting properties, feelings and transparency, can be obtained by melt spinning a composition comprising a polyester, at least one bromine containing flame-retardant selected from the group consisting of a brominated epoxy based flame-retardant, a brominated phenoxy resin based flame-retardant and a brominated phosphate based flame-retardant and an organic cyclic phosphorus compound and/or a phosphoric ester amide compound and optionally the composition further comprises organic fine particles and/or inorganic fine particles.

Specifically, the present invention relates to a flame retardant polyester based artificial hair, formed from a composition comprising (A) at least one polyester selected from a polyalkylene terephthalate and/or a copolymer polyester comprising polyalkylene terephthalate as a main component, (B) at least one bromine containing flame-retardant selected from the group consisting of a brominated epoxy based flame-retardant, a brominated phenoxy resin based flame-retardant and a brominated phosphate based flame-retardant and (C) a phosphorus compound selected from an organic cyclic phosphorus compound and/or a phosphoric ester amide compound, where the composition is obtained by melt kneading 100 parts by weight the polyester (A) and 5 to 30 parts by weight of a mixture of the bromine containing flame-retardant (B) and the phosphorus compound (C).

The weight ratio of the flame-retardant (B) and the phosphorus compound (C) is preferably 90/10 to 10/90.

The polyalkylene terephthalate is preferably at least one member selected from the group consisting of polyethylene terephthalate, polypropylene terephthalate, and polybutylene terephthalate.

The flame-retardant (B) is preferably at least one member selected from the group consisting of a brominated epoxy based flame-retardant and a brominated phenoxy resin based flame-retardant represented by formulae (1) to (4):

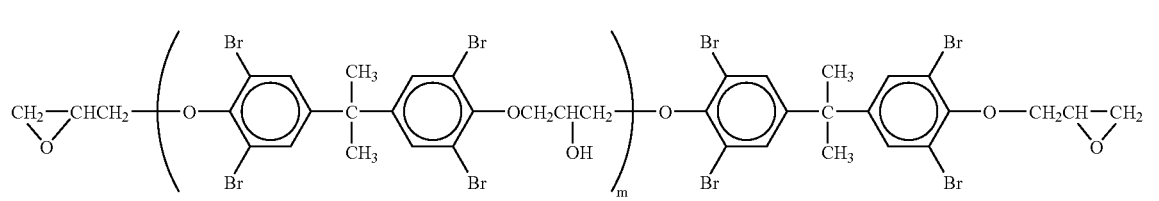

wherein m represents an integer of 0 to 100;

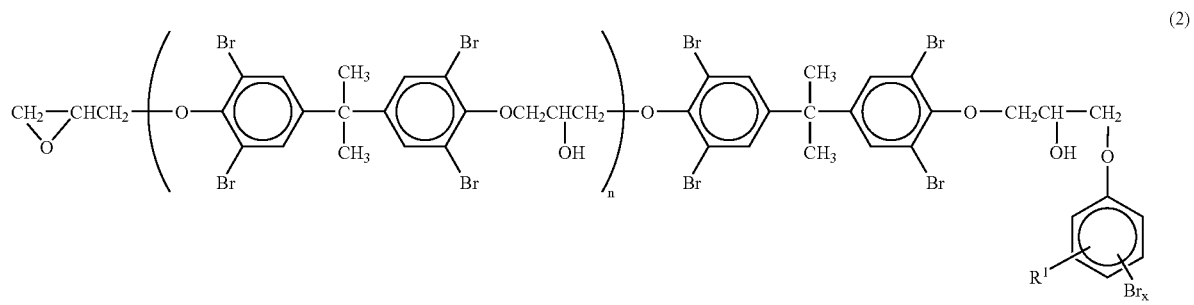

wherein $R^1$ represents alkyl group having 1-10 carbon atoms, n represents an integer of 0 to 100 and x represents an integer of 0 to 5;

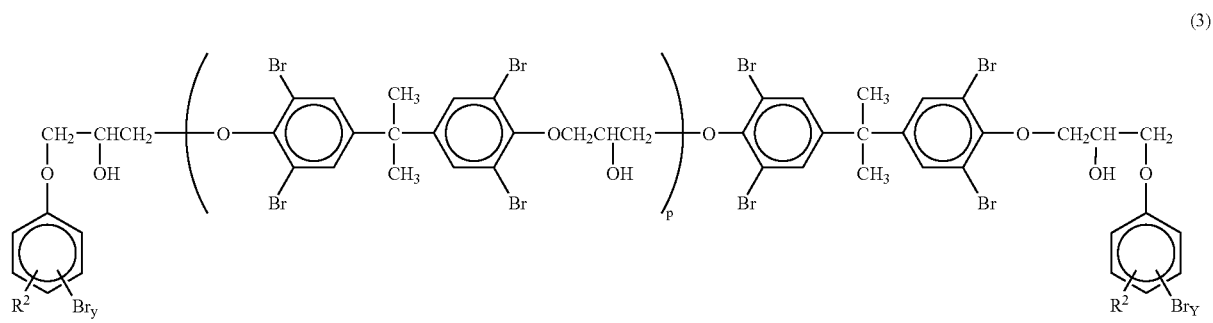

wherein $R^2$ represents alkyl group having 1-10 carbon atoms, p represents an integer of 0 to 100 and y represents an integer of 0 to 5;

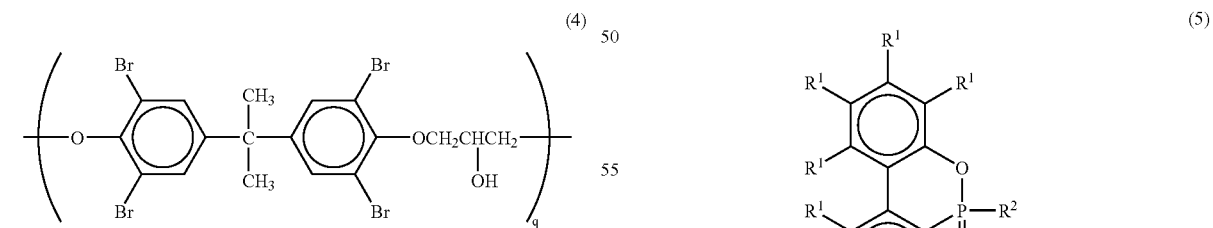

wherein q represents an integer of 80 to 200.

The flame-retardant (B) is preferably at least one brominated phosphate ester selected from the group consisting of tris(bromoethyl)phosphate, tris(bromopropyl)phosphate, tris(dibromopropyl)phosphate, tris(bromobutyl)phosphate, tris(dibromobutyl)phosphate, tris(bromoneopentyl)phosphate, tris(dibromoneopentyl)phosphate and tris(tribromoneopentyl)phosphate.

The phosphorus compound (C) is preferably an organic cyclic phosphorus compound and/or a phosphoric ester amide compound represented by formulae (5) to (13):

where $R^1$ represents a hydrogen atom or a linear or branched alkyl group and each of the $R^1$ may be identical or different from each other, and $R^2$ represents a hydrogen atom, a linear or branched alkyl group, a linear or branched hydroxy alkyl group, a cycloalkyl group, a substituted or unsubstituted aryl group, or a substituted or unsubstituted aralkyl group;

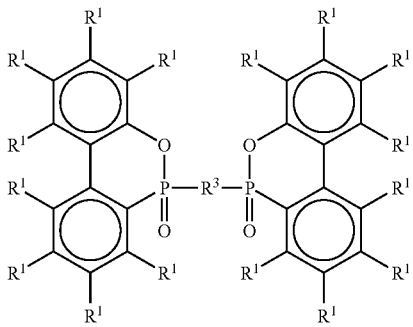

(6)

where $R^1$ represents a hydrogen atom or a linear or branched alkyl group and each of the $R^1$ may be identical or different from each other, $R^3$ represents a divalent linear or branched alkylene group, a linear or branched hydroxy alkylene group, a cycloalkylene group, an alkylene group having an ether oxygen in a principal chain thereof, a substituted or unsubstituted arylene group, a substituted or unsubstituted aralkylene group, an α,α'-xylylene group, a substituted-α,α'-xylylene group, an α,α'-meta-xylylene group, or a substituted-α,α'-xylylene group;

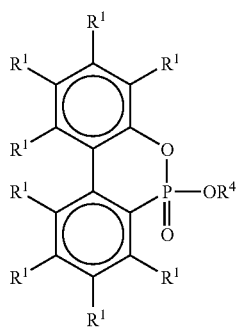

(7)

where $R^1$ represents a hydrogen atom or a linear or branched alkyl group and each of the $R^1$ may be identical or different from each other, $R^4$ represents a hydrogen atom, a linear or branched alkyl group, a cycloalkyl group, a substituted or unsubstituted aryl group, or a substituted or unsubstituted aralkyl group;

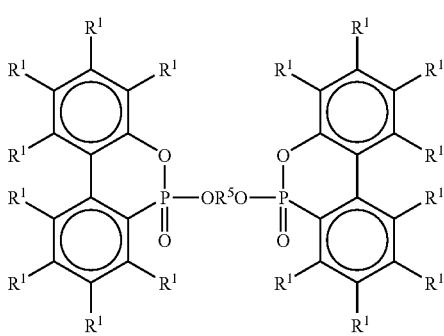

(8)

where $R^1$ represents a hydrogen atom or a linear or branched alkyl group, and each of the $R^1$ may be identical or different from each other, and $R^5$ represents a divalent linear or branched alkylene group, a cycloalkylene group, an alkylene group having an ether oxygen in a principal chain thereof, a substituted or unsubstituted arylene group, a substituted or unsubstituted aralkylene group, an α,α'-xylylene group, a substituted-α,α'-xylylene group, an α,α'-meta-xylylene group, or a substituted-α,α'-xylylene group;

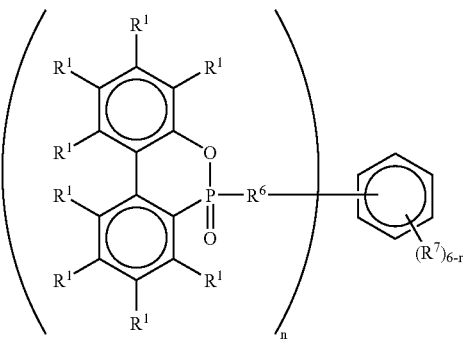

(9)

where, $R^1$ represents a hydrogen atom or a linear or branched alkyl group and each of the $R^1$ may be identical or different from each other, $R^6$ represents a divalent linear or branched alkylene group or a cycloalkylene group, $R^7$ represents a hydrogen atom or a linear or branched alkyl group, r represents an integer of 1 to 5;

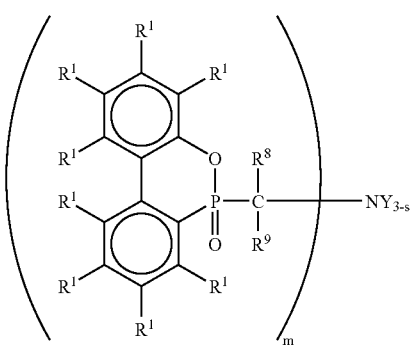

(10)

where, $R^1$ represents a hydrogen atom or a linear or branched alkyl group and each of the $R^1$ may be identical or different from each other, $R^8$ and $R^9$ are each independently selected from the group consisting of a hydrogen atom, a linear or branched alkyl group and a cycloalkyl group, Y represents a hydrogen atom, a linear or branched alkyl or cycloalkyl group, a substituted or unsubstituted aryl group, or a substituted or unsubstituted aralkyl group, and s represents 1 or 2;

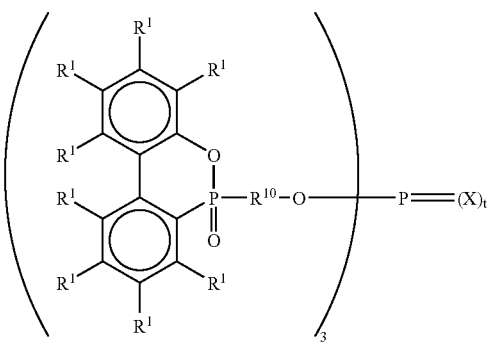

(11)

where $R^1$ represents a hydrogen atom or a linear or branched alkyl group and each of the $R^1$ may be identical or different from each other, $R^{10}$ represents a divalent linear or branched alkylene group, a linear or branched hydroxy alkylene group, a cycloalkylene group, an alkylene group having an ether oxygen in a principal chain thereof, a substituted or unsubstituted arylene group, or a substituted or unsubstituted aralkylene group, X represents oxygen atom or sulfur atom, and t represents 0 or 1;

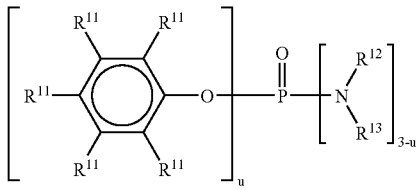

(12)

where $R^{11}$ represents a hydrogen atom or a linear or branched alkyl group and each of the $R^{11}$ may be identical or different from each other, $R^{12}$ and $R^{13}$ are each independently selected from the group consisting of a hydrogen atom, a linear or branched alkyl group, a linear or branched hydroxy alkyl group, cycloalkyl group, a substituted or unsubstituted aryl group, or a substituted or unsubstituted aralkyl group, and u represents 1 or 2;

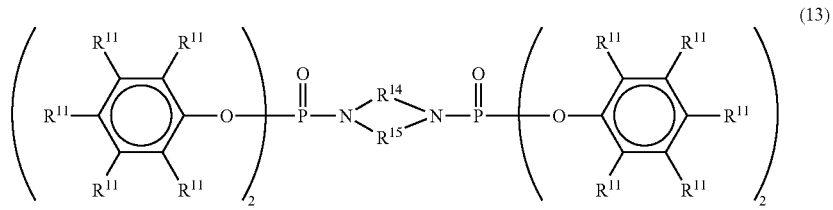

(13)

where $R^{11}$ represents a hydrogen atom a linear or branched alkyl group and each of the $R^{11}$ may be identical or different from each other, $R^{14}$ and $R^{15}$ are each independently selected from the group consisting of a divalent linear or branched alkylene group, a linear or branched hydroxy alkylene group, cycloalkylene group, an alkylene group having an ether oxygen in a principal chain thereof, a substituted or unsubstituted arylene group, or a substituted or unsubstituted aralkylene group, each of them may be identical or different from each other.

Further the flame retardant polyester artificial hair preferably contains organic fine particles (D) and/or inorganic fine particles (E).

The organic fine particles (D) are preferably composed of at least one member selected from the group consisting of polyarylate, polyamide, fluororesin, silicone resin, cross-linked acrylic resin, and cross-linked polystyrene.

The inorganic fine particles (E) is preferably at least one member selected from the group consisting of antimony trioxide, antimony pentoxide, sodium antimonate, calcium carbonate, silicon oxide, titanium oxide, aluminum oxide, zinc oxide, talc, kaolin, montmorillonite, bentonite, and mica.

The flame retardant polyester based artificial hair of the present invention preferably is in the form of a non-crimped yarn.

The flame retardant polyester based artificial hair of the present invention preferably is spun-dyed.

Further the flame retardant polyester based artificial hair of the present invention preferably has a single fiber size of 10 to 100 dtex.

According to the present invention there can be provided a flame retardant polyester based artificial hair which maintains fiber properties possessed by conventional polyester fibers such as heat resistance, strength and elongation and the like and has excellent setting properties, feeling to the touch, transparency and significantly excellent flame resistance and also has adjusted gloss on the surface of the fibers.

BEST MODE FOR CARRYING OUT THE INVENTION

Figure 1:
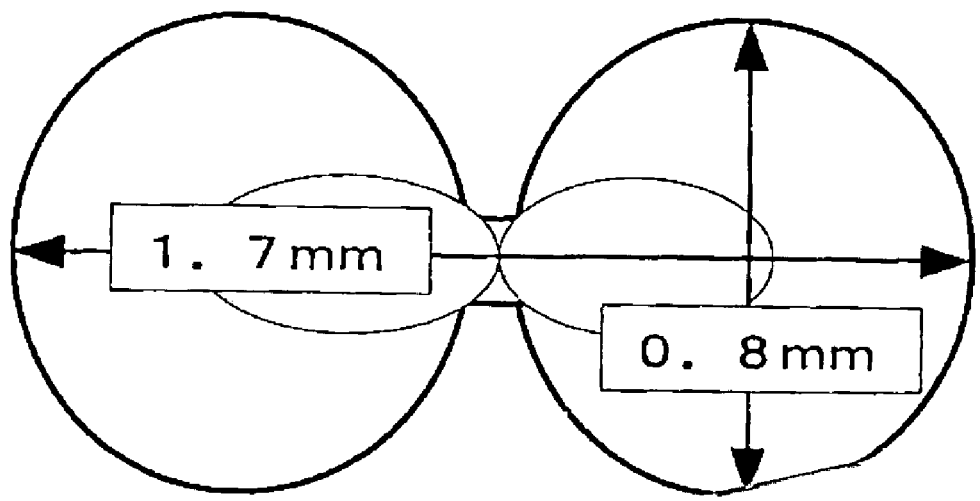
FIG. 1 is a cross-section of a nozzle hole of a spinneret of a melt spinning machine used for spinning to produce the polyester based artificial hair of the present invention.

The flame retardant polyester based artificial hair of the present invention is formed of fibers melt spun from a composition comprising (A) at least one polyester selected from a polyalkylene terephthalate and/or a copolymer polyester comprising polyalkylene terephthalate as a main component, (B) at least one bromine containing flame-retardant selected from the group consisting of a brominated epoxy based flame-retardant, a brominated phenoxy resin based flame-retardant and a brominated phosphate based flame-retardant and (C) a phosphorus compound selected from an organic cyclic phosphorus compound and/or a phosphoric ester amide compound, where the composition is obtained by melt kneading 100 parts by weight of the polyester (A), and 5 to 30 parts by weight of a mixture of the bromine containing flame-retardant (B) and the phosphorus compound (C).

Examples of the polyalkylene terephthalate of polyester (A) of the present invention, include polyalkylene terephthalates such as polyethylene terephthalate, polypropylene terephthalate, and polybutylene terephthalate and the like.

Examples of the copolymer polyester comprising polyalkylene terephthalate as a main component include copolymer polyesters comprising such polyalkylene terephthalate as a main component and a small amount of a copolymerization component. The phrase "comprising as a main component" refers to "comprising in an amount of 80 mol % or more".

Examples of the copolymerization component include: polycarboxylic acids such as isophthalic acid, orthophthalic acid, naphthalenedicarboxylic acid, paraphenylenedicarboxylic acid, trimellitic acid, pyromellitic acid, succinic acid, glutaric acid, adipic acid, suberic acid, azelaic acid, sebacic acid, and dodecanedioic acid, and their derivatives; dicarboxylic acids having sulfonic acid salt such as 5-sodium sulfoisophthalic acid, dihydroxyethyl 5-sodium sulfoisophthalate, and their derivatives; 1,2-propanediol, 1,3-propanediol, 1,4-butanediol, 1,6-hexanediol, neopentyl glycol, 1,4-cyclohexanedimethanol, diethylene glycol, polyethylene glycol, trimethylolpropane, pentaerythritol, 4-hydroxybenzoic acid, and ε-caprolactone.

Typically, the copolymer polyester is preferably produced by adding a small amount of a copolymerization component to a main component which is a polymer of terephthalic acid and/or its derivative (for example, methyl terephthalate) and alkylene glycol, and reacting these components with a view toward stability and convenience for handling. However, the copolymer polyester may be produced by adding a small amount of a monomer or oligomer component as a copolymerization component to a main component which is a mixture of terephthalic acid and/or its derivative (for example, methyl terephthalate) and alkylene glycol, and polymerizing the components.

The copolymer polyester may be any copolymer polyester in which the copolymerization component is polycondensed with the main chain and/or the side chain of polyalkylene terephthalate as a main component. There are no particular limitations to the manner of copolymerization and the like.

Examples of the copolymer polyester comprising polyalkylene terephthalate as a main component include: a polyester obtained by copolymerizing polyethylene terephthalate as a main component with ethylene glycol ether of bisphenol A; a polyester obtained by copolymerizing polyethylene terephthalate as a main component with 1,4-cyclohexanedimethanol; and a polyester obtained by copolymerizing polyethylene terephthalate as a main component with dihydroxyethyl 5-sodium sulfoisophthalate. The polyalkylene terephthalate and its copolymer polyester may be used singly or in a combination of two or more.

Preferable examples thereof include polyethylene terephthalate, polypropylene terephthalate, polybutylene terephthalate, and a copolymer polyester (a polyester obtained by copolymerizing polyethylene terephthalate as a main component with ethylene glycol ether of bisphenol A; a polyester obtained by copolymerizing polyethylene terephthalate as a main component with 1,4-cyclohexanedimethanol; a polyester obtained by copolymerizing polyethylene terephthalate as a main component with dihydroxyethyl 5-sodium sulfoisophthalate; or the like). A mixture of two or more of these is also preferable.

The intrinsic viscosity of the polyester (A) is preferably 0.5 to 1.4, and more preferably it is 0.6 to 1.2. If the intrinsic viscosity is less than 0.5, the resulting fiber tends to have reduced mechanical strength. If more than 1.4, the melt viscosity is increased as the molecular weight is increased, and thus the fiber tends to be melt spun only with difficulty, and to have a non-uniform size.

The at least one bromine containing flame-retardant (B) selected from the group consisting of a brominated epoxy based flame-retardant, a brominated phenoxy resin based flame-retardant and a brominated phosphate based flame-retardant used in the present invention is not particularly limited, and a generally used compound can be used.

Examples of the bromine containing flame-retardant (B) include a non-endcapped brominated epoxy based flame-retardant represented by the formula (1), a one end-capped brominated epoxy based flame-retardant represented by the formula (2), a both end-capped brominated epoxy based flame-retardant represented by the formula (3) and a brominated phenoxy resin based flame-retardant represented by the formula (4).

In the non-endcapped brominated epoxy based flame-retardant represented by the formula (1) the integer m is preferably 0 to 100, more preferably 5 to 95. Compounds having m of more than 100 are hard to obtain because they are difficult to synthesize.

Specific examples of the non-endcapped brominated epoxy based flame-retardant represented by the general formula (1) include compounds represented by the following formulae:

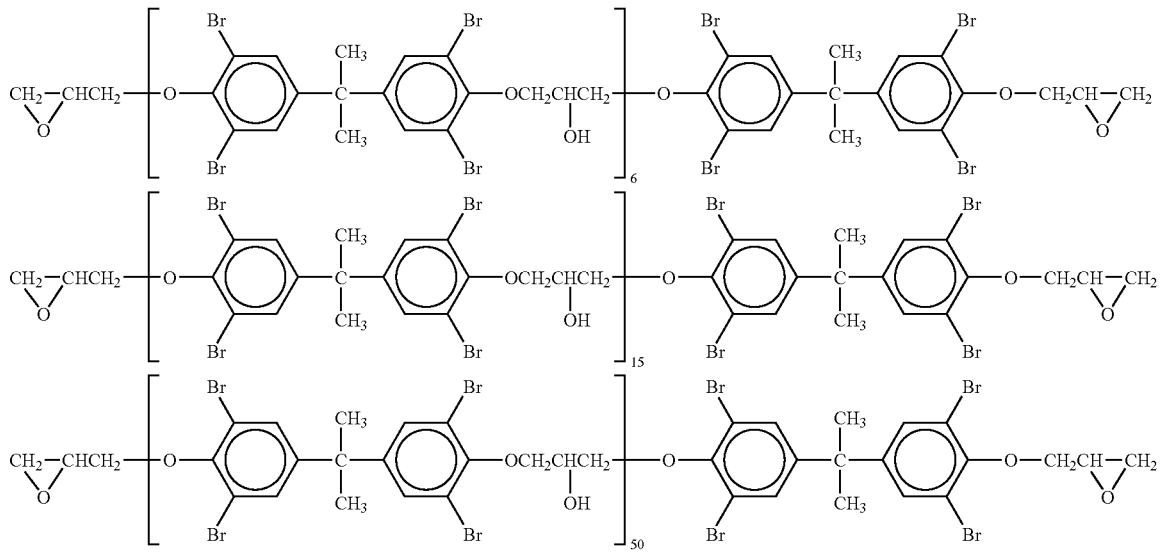

In the one end-capped brominated epoxy based flame-retardant represented by the formula (2), the integer n is preferably 0 to 100, more preferably 5 to 95. Compounds having n of more than 100 are hard to obtain because they are difficult to synthesize. In the formula, x represents an integer of 0 to 5, and it is preferable when x is 1 to 3.

Specific examples of the one end-capped brominated epoxy based flame-retardant represented by the formula (2) include compounds represented by the following formulae;

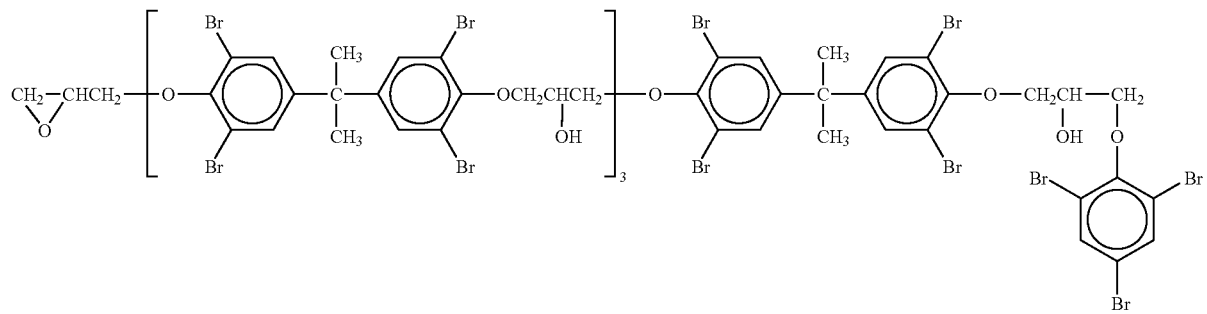

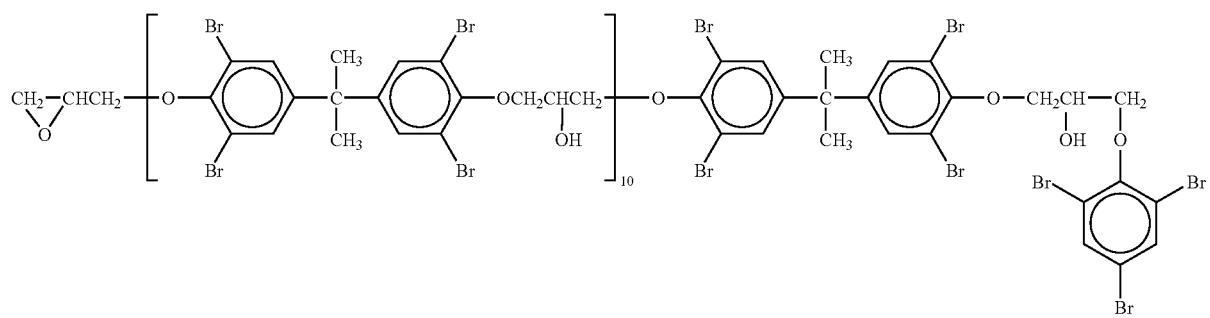

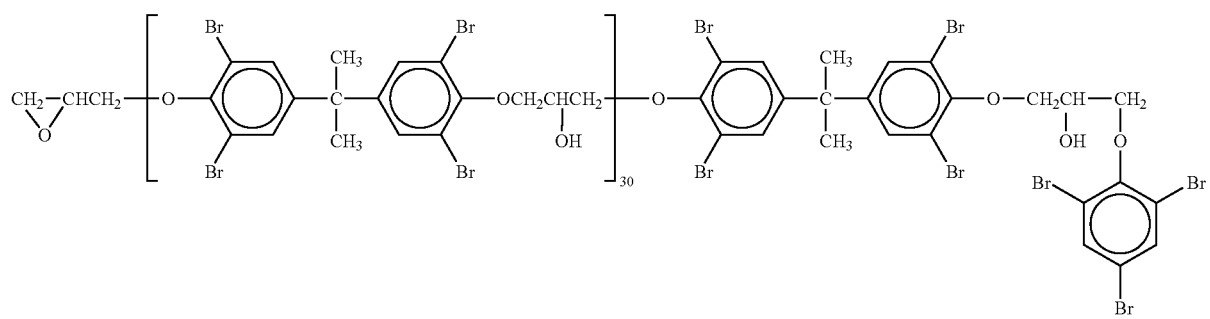

In the both end-capped brominated epoxy based flame-retardant represented by the formula (3), the integer p is preferably 0 to 100, more preferably 5 to 95. Compounds having p of more than 100 are hard to obtain because they are difficult to synthesize. In the formula, y represents an integer of 0 to 5, and it is preferable when y is 1 to 3.

Specific examples of the both end-capped brominated epoxy based flame-retardant represented by the formula (3) include compounds represented by the following formulae:

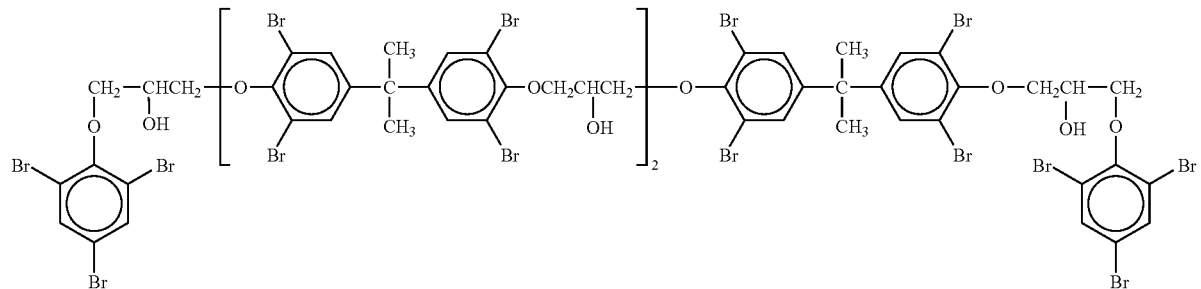

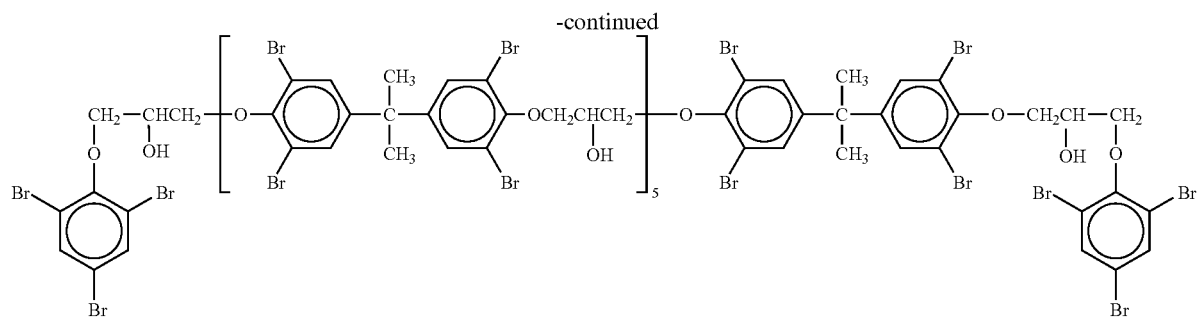

In the brominated phenoxy resin based flame-retardant represented by the formula (4), the integer q is preferably 80 to 200, more preferably 85 to 200. Compounds having q of more than 200 are hard to obtain because they are difficult to synthesize.

Specific examples of the brominated phenoxy resin based flame-retardant represented by the formula (4), include compounds represented by the following formulae:

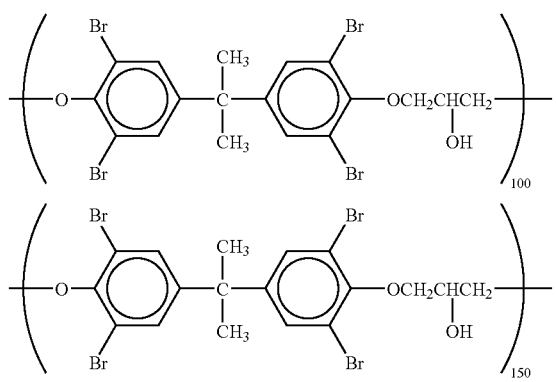

Examples of the bromine containing flame-retardant (B) include tris(bromoethyl)phosphate, tris(bromopropyl)phosphate, tris(dibromopropyl)phosphate, tris(bromobutyl)phosphate, tris(dibromobutyl)phosphate, tris(bromoneopentyl) phosphate, tris(dibromoneopentyl)phosphate and tris (tribromoneopentyl)phosphate.

As the bromine containing flame-retardant (B), the both end-capped brominated epoxy based flame-retardant, a brominated phenoxy resin based flame-retardant and a brominated phosphate based flame-retardant are preferable with a view toward flame-retardance, feeling to the touch of fibers and spinning stability. These may be used alone or as a mixture of two or more thereof.

By using the bromine containing flame-retardant (B) and the phosphorous compound (C) selected from the organic cyclic phosphorous compound and/or the phosphoric ester amide in combination, the artificial hair of the present invention catches fire only with difficulty and has shortened afterflame time, and further it is possible to inhibit dripping of the fiber when compared to using the bromine containing flame-retardant or the phosphorous compound alone due to different flame-resisting mechanisms each compound has. Thus, it becomes possible to significantly improve flame resistance of the artificial hair.

Examples of the phosphorous compound (C) selected from the organic cyclic phosphorous compound and/or the phosphoric ester amide used in the present invention include compounds having structure represented by the formulae (5) to (13).

Specific examples of compounds represented by the formula (5) include compounds having the following structures and the like.

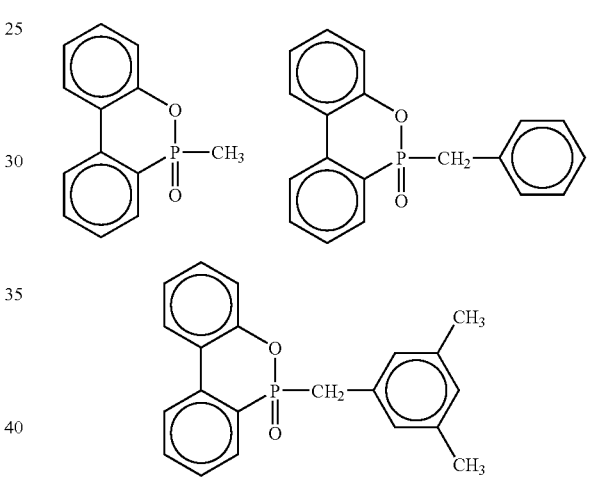

Specific examples of compounds represented by the formula (6) include compounds having the following structures and the like.

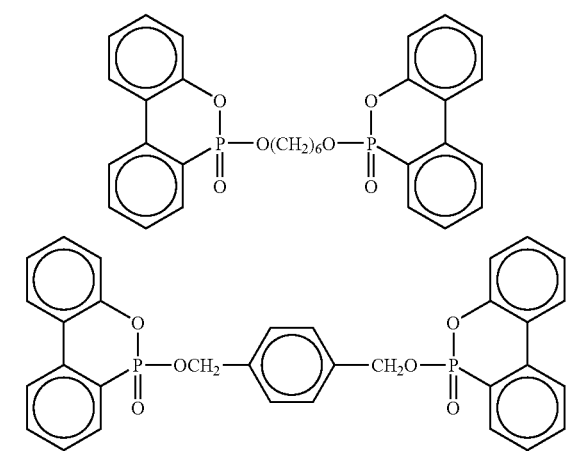

Specific examples of compounds represented by the formula (7) include compounds having the following structures and the like.

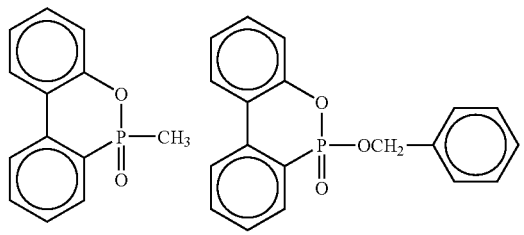

Specific examples of compounds represented by the formula (8) include compounds having the following structures and the like.

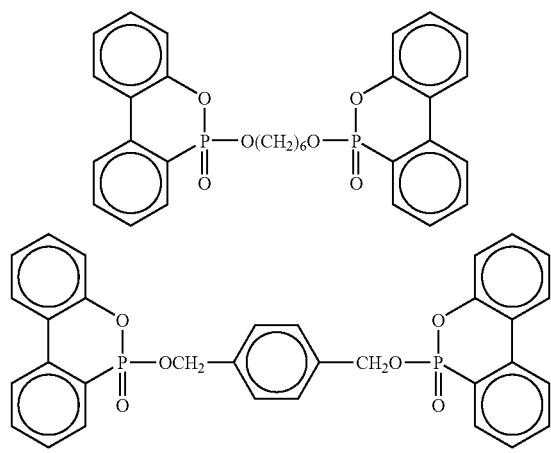

In the compounds represented by the formula (9), r in the formula represents an integer 1 to 5, preferably 1 to 3. Specific examples of compounds represented by the formula (9) include compounds having the following structures and the like.

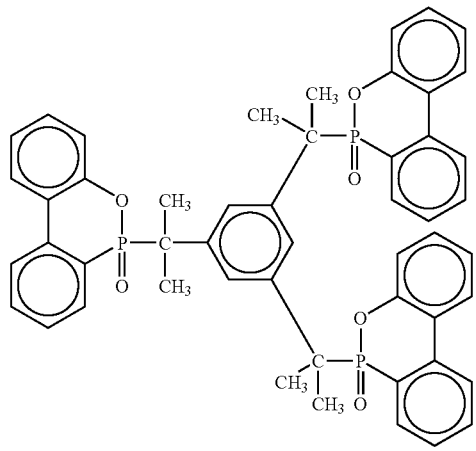

Specific examples of compounds represented by the formula (10) include compounds having the following structures and the like.

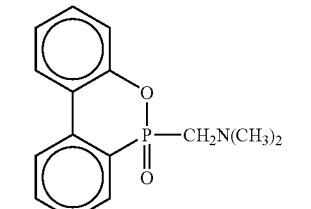

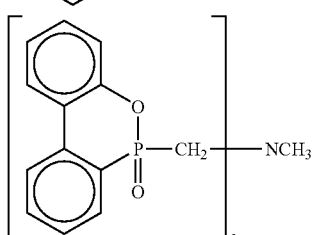

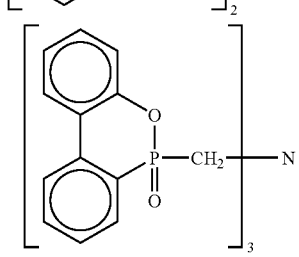

Specific examples of compounds represented by the formula (11) include compounds having the following structures and the like.

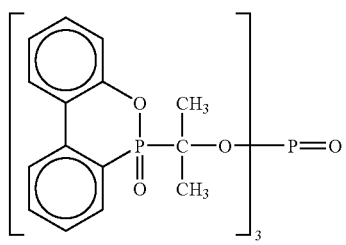

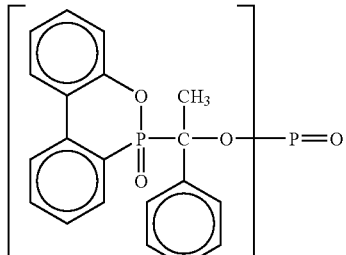

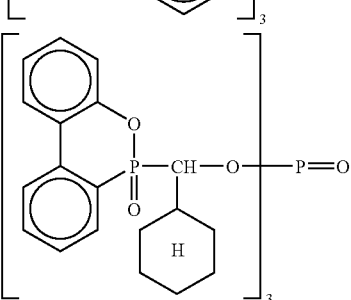

Specific examples of compounds represented by the formula (12) include diphenyl(cyclohexyl amide)phosphate, diphenyl(diethyl amide)phosphate, diphenyl(morphoride)phosphate, diphenyl(octyl amide)phosphate, diphenyl(benzyl amide)phosphate, diphenyl(allyl amide)phosphate, diphenyl(anilide)phosphate and (dimorphoride)phenyl phosphate and the like.

Specific examples of compounds represented by the formula (13) include compounds having the following structure and the like.

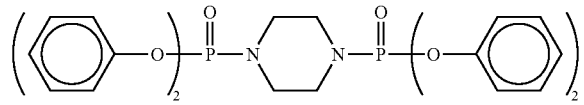

The total amount of the bromine containing flame-retardant (B) and the phosphorous compound (C) to be used in the present invention is preferably 5 to 30 parts by weight, more preferably 6 to 27 parts by weight and still more preferably 7 to 25 parts by weight based on 100 parts by weight of the polyester (A). If the amount of the bromine containing flame-retardant (B) and the phosphorous compound (C) is less than 5 parts by weight, the effect of flame resistance tends to be hardly obtained, and if more than 30 parts by weight, mechanical properties, heat resistance and drip resistance tend to be damaged.

The weight ratio of the bromine containing flame-retardant (B) and the phosphorous compound (C) in the present invention is preferably 90/10-10/90, more preferably 80/20-20/80 and still more preferably 70/30-30/70. If the weight ratio is more than 90/10 or less than 10/90, the effect of flame resistance due to the use of the bromine containing flame-retardant (B) in combination with the phosphorous compound (C) tends to be hardly demonstrated, and thus the flame resistant property becomes close to the one when each component is used alone and the effect of flame resistance tends to be deteriorated.

In the present invention, it is possible to form fine projections on a surface of the fiber by blending organic fine particles (D) and/or inorganic fine particles (E) and to adjust the surface to have a natural gloss close to human hair when used as artificial hair.

As the organic fine particles (D), any organic resin component may be used insofar as the component is not compatible or partially not compatible with the polyester (A) as a main component, the bromine containing flame-retardant (B) and the phosphorous compound (C). For examples, a polyarylate, a polyamide, a fluororesin, silicone resin, crosslinked acrylic resin, crosslinked polystyrene, and the like are preferably used. These may be used singly or in a combination of two or more.

As the inorganic fine particles (E), such a component having a refractive index close to those of the polyester (A), the bromine containing flame-retardant (B) and the phosphorous compound (C) is preferable. This is because the component has an influence on transparency and coloration of the fiber. Examples include antimony trioxide, antimony pentoxide, sodium antimonate, calcium carbonate, silicon oxide, titanium oxide, aluminum oxide, zinc oxide, talc, kaolin, montmorillonite, bentonite, and mica. These may be used singly or in a combination of two or more. The inorganic fine particles (E) used in the present invention may be surface treated with an epoxy compound, silane compound, isocyanate compound, titanate compound, or the like as required.

The organic fine particles (D) and/or inorganic fine particles (E) are used in an amount of preferably 0.1 to 5 parts by weight, more preferably 0.2 to 3 parts by weight, and still more preferably 0.3 to 2 parts by weight based on 100 parts by weight of the polyester (A), but the amount is not specifically limited thereto. If the organic fine particles (D) and/or inorganic fine particles (E) are used in an amount of more than 5 parts by weight, the fiber tends to have impaired appearance, hue, and coloration. If less than 0.1 parts by weight, only a small number of minute projections are formed on the fiber surface, and thus gloss on the fiber surface tends to be inadequately adjusted.

The polyester composition used in the present invention can be produced by, for example, dry blending the polyester (A), flame-retardant (B), phosphorous compound (C) and further the organic fine particles (D) and/or inorganic fine particles (E) and then melt kneading the components in various common kneading machines.

Examples of the kneading machines include a single-screw extruder, twin-screw extruder, roll, Banbury mixer, and kneader. Of these, a twin-screw extruder is preferable in terms of adjustment of the kneading degree and convenience of operation.

For example, the composition for the present invention can be obtained by, melt-kneading at a barrel temperature of 260 to 300° C., a discharge amount of 50 to 150 kg/hr, and a screw rotational speed of 150 to 200 rpm with a twin screw extruder having a screw diameter of 45 mm, taking up a strand out of dies, and after cooling with water, pelletizing the strand with a strand cutter.

The flame retardant polyester based artificial hair of the present invention can be produced by melt spinning the above-described polyester composition by a typical melt spinning process.

Specifically, a spun yarn can be obtained by, for example: melt spinning the composition while setting an extruder, gear pump, spinneret, and the like at a temperature of 270 to 310° C.; allowing the spun yarn to pass through a heat sleeve; then cooling the yarn to a glass transition temperature or lower; and taking off the yarn at a rate of 50 to 5,000 m/min. The size of the spun yarn can also be controlled by cooling the yarn in a tank filled with cooling water. The temperature or length of the heat sleeve, the temperature or spraying amount of cooling air, the temperature of the cooling tank, the cooling time, and the take-off rate can be appropriately adjusted according to the discharge amount and the number of holes in the spinneret.

The resulting spun yarn may be hot drawn by either a two-step process comprising winding up the spun yarn once and then drawing the yarn, or a direct spinning and drawing process comprising successively drawing the spun yarn without winding. Hot drawing is carried out by a one-stage drawing process or a multistage drawing process. As a heating means in hot drawing, a heat roller, heat plate, steam jet apparatus, hot water tank, or the like can be used. These can be appropriately used in combination.

The polyester based artificial hair of the present invention may contain various additives such as a heat resistant agent, a photostabilizer, a fluorescent agent, an antioxidant, an antistatic agent, a pigment, a plasticizer, and a lubricant as required. The fiber containing a pigment can be provided as a spun dyed fiber.

When the polyester based artificial hair of the present invention thus obtained is a fiber in the form of a non-crimped fiber, and has a size of usually 10 to 100 dtex, and furthermore 20 to 90 dtex, it is suitable for artificial hair. If the size of the flame-retardant polyester fiber is less than 10 dtex, the fiber tends not to maintain properties necessary for artificial hair because the fiber is too fine. If more than 100 dtex, the fiber tends to have plastic like feeling because the fiber is too thick and becomes hard.

Preferably, the artificial hair has heat resistance sufficient to allow a thermal beauty appliance (hair iron) to be used thereon at 160 to 200° C. Preferably, the artificial hair catches fire only with difficulty, and has self-extinguishing properties.

When the polyester based artificial hair of the present invention is spun dyed, the artificial hair can be used as is. When the artificial hair is not spun dyed, it can be dyed under the same conditions as with a common polyester fiber. The pigment, dye, adjuvant, or the like used for dyeing preferably exhibits excellent weather resistance and flame retardance.

The polyester based artificial hair of the present invention exhibits excellent curl setting properties when a thermal beauty appliance (hair iron) is used, and also exhibits excellent curl holding properties. The polyester based artificial hair of the present invention can be appropriately matted with irregularities on the fiber surface and can be used for artificial hair. Further, an oil agent such as a fiber surface treating agent or a softening agent can provide the polyester based artificial hair of the present invention with feeling and texture closer to human hair.

The flame retardant polyester based artificial hair of the present invention may be used in combination with another material for artificial hair, such as a modacrylic fiber, a polyvinyl chloride fiber, or a nylon fiber, or it may be used in combination with human hair.

Next, the present invention will be described in more detail with reference to Examples. However, it should be understood that the present invention is not limited thereto.

EXAMPLES

The properties are measured as follows:
(Size of Fiber)
One hundred filaments with a filament length of 1 m were bundled to a tow. A weight of ten tows is measured and the average value of the weight of ten tows is defined as a size of fiber.

(Strength and Elongation)
Both 10 mm-long ends of one 40 mm-long filament are sandwiched in a board (thin paper) to which a two-sided tape applied with an adhesive is bonded, and are air-dried overnight to prepare a sample with a length of 20 mm. The sample is mounted on a test machine (INTESCO Model 201 manufactured by INTESCO Co., Ltd.), and a test is carried out at a temperature of 24° C., at a humidity of 80% or less, at a load of 1/30 gF×size (denier) and at a tensile rate of 20 mm/min to measure strength and elongation. The test is repeated ten times under the same conditions, and the average values are defined as strength and elongation of the filament.

(Gloss)
A tow filament with a length of 30 cm and a total size of 100,000 dtex is visually evaluated under sunlight.
Very good: Gloss is adjusted to be the same as in human hair
Good: Gloss is appropriately adjusted
Fair: Gloss is a little too high or a little too low
Bad: Gloss is too high or too low (Transparency)
A tow filament with a length of 30 cm and a total size of 100,000 dtex is visually evaluated under sunlight comparing with a standard filament (A tow filament of polyethylene terephthalate with a total size of 100,000 dtex).
Good: Same level as the standard filament
Fair: A little opaque compared to the standard filament
Bad: obviously opaque compared to the standard filament (Touch Feeling)
Stickiness is evaluated using a tow filament with a length of 30 cm and a total size of 100,000 dtex by touching with fingers.
Good: Not sticky
Fair: A little sticky
Bad: Sticky (Flame Retardance)
a) Flammability
A filament having a size of about 50 dtex is cut into filaments with a length of 150 mm each. Filaments with a weight of 0.7 g are bundled, with one end of the bundle sandwiched by a clamp, and the bundle is fixed on a stand and hung vertically. The fixed filaments with an effective length of 120 mm are brought into contact with 20 mm-long fire for 3 seconds, and burned to evaluate the flammability.
Very good: Afterflame time is 0 second (Filaments do not catch fire)
Good: Afterflame time is less than 3 seconds
Fair: Afterflame time is 3 to 10 seconds
Bad: Afterflame time is more than 10 seconds b) Limiting Oxygen Index (LOI)
0.25 g of filaments having a length of 16 cm is weighed, and both ends of the filaments are lightly bundled with a double-stick tape, and the filaments are pinched and then twisted with a twist device. After the filaments are sufficiently twisted, they are folded in two right at the middle of the sample, and the resulting two filaments are twisted together. Then, the ends of the filaments are stuck with a SELLOTAPE (registered trademark) so that the entire length becomes 7 cm. The filaments are pre-dried at 105° C. for 60 minutes, and further dried in a desiccator for at least 30 minutes.

The dried sample is fixed in a combustion chamber and the inside of the chamber is adjusted to have the specified oxygen concentration. After 40 seconds, the sample is ignited from the upper part with an igniter restricted to 8 to 12 mm, and, the igniter is separated away after ignition.

An oxygen concentration at which the sample is burned by at least 5 cm or continues to be burned for at least 3 minutes is examined. The test is repeatedly conducted three times under the same conditions to obtain a limiting oxygen index.

(Iron Setting Property)
The iron setting property is an index of the extent to which a hair curling iron can perform curl setting easily and to hold the curl shape. Filaments are loosely sandwiched in a hair iron heated to 180° C., and pre-heated three times by rubbing.

Adhesion among the filaments, crimping and end breakage of the filaments at this time are visually evaluated. Next, the pre-heated filaments are wound around the hair curling iron and held for 10 seconds, and then the curling iron is withdrawn.

The degree of ease of withdrawing the curling iron (rod out properties) and curl holding properties when withdrawing the curling iron are visually evaluated.
a) Adhesion among filaments
Good: no adhesion is caused.
Fair: adhesion is slightly caused.
Bad: adhesion is caused.
b) Crimping/End breakage of the filaments
Good: no crimping and end breakage is caused.
Fair: crimping and end breakage are slightly caused.
Bad: crimping and end breakage are caused.
c) Rod out properties
Good: the iron rod is smoothly withdrawn.
Fair: the iron rod is slightly difficult to be withdrawn.
Bad: the iron rod is difficult to be withdrawn.
d) Setting property
Good: a shape of curling is maintained.
Fair: a shape of curling is slightly distorted.
Bad: a shape of curling is distorted.

Examples 1 to 8

Compositions having components ratios shown in Table 1 below were dried so as to have a moisture content of 100 ppm or less. To each of these compositions, 2 parts of a coloring polyester pellet PESM6100 BLACK (manufactured by Dainichiseika Color & Chemicals Mfg. Co., Ltd., carbon black content: 30%, polyester contained in the component (A)) were added. The compositions were dry blended. The blend was fed into a twin-screw extruder and melt kneaded at 280° C. to form a pellet. Then, the pellet was dried to a moisture content of 100 ppm or less.

Next, the pellet was put into a melt spinning machine, and the molten polymer was discharged from a spinneret having 40 nozzle holes represented in FIG. 1 at 280° C. The discharged polymer was air cooled with a cooling wind of 20° C. and rolled up at a rate of 100 m/min to obtain un-drawn yarns.

The thus obtained un-drawn yarn was drawn to form a four-fold drawn yarn using a heat roll heated at 85° C., heat treated using a heat roll heated at 200° C. and rolled up at a speed of 30 m/min to obtain polyester based fibers (multi-filament) with a size of around 65 dtex.

Strength and elongation, gloss, transparency, touch feeling, flame retardance, iron setting properties of the resulting polyester based fiber were evaluated. The results are shown in Table 2 below.

Comparative Example 1 to 3

The compositions having component ratios shown in Table 1 were dried so as to have a moisture content of 100 ppm or less and polyester fibers (multi-filament) having a single fiber size of around 50 dtex were obtained in the same manner as in the Examples.

Strength and elongation, gloss, transparency, touch feeling, flame retardance and iron setting properties of the resulting fiber were evaluated. The results are shown in Table 2 below.

TABLE 1

|   |   | Example |   |   |   |   |   |   |   | Comparative Example |   |   |
|---|---|---|---|---|---|---|---|---|---|---|---|---|
|   |   | 1 | 2 | 3 | 4 | 5 | 6 | 7 | 8 | 1 | 2 | 3 |
| (A) | EFG-10 *1 | 100 | 100 | 100 | 100 | 100 | 100 | 100 | 100 | 100 | 100 | 100 |
| (B) | CR-900 *2 | 8 | 8 | 8 |   |   |   | 2 |   | 2 | 20 |   |
|   | SR-T20000 *3 |   |   |   | 10 | 10 | 10 |   | 5 |   |   |   |
| (C) | SANKO-BCA *4 | 4 | 4 |   | 5 | 5 |   | 10 | 10 |   |   |   |
|   | SP-703 *5 |   |   | 6 |   |   | 8 |   |   | 1 | 15 | 25 |
| (D) | U-PowderD *6 |   | 0.5 |   |   |   |   |   | 0.5 |   |   |   |
| (E) | HAP-60NPG *7 |   |   |   |   | 1 |   |   |   |   |   |   |
| Others | AdekastabPEP-36 *8 |   | 0.5 |   |   |   |   |   | 0.5 |   |   |   |

*1: Polyethylene terephthalate, manufactured by Kanebo Gohsen, Ltd.
*2: Bromine containing phosphate ester, manufactured by Daihachi Chemical Industry Co., Ltd.
*3: Brominated epoxy based flame retardant, manufactured by Sakamoto Yakuhin Kogyo Co., Ltd.
*4: Organic cyclic phosphorus compound, manufactured by SANKO CO., LTD.
*5: Phosphoric ester amide, manufactured by Shikoku Chemicals Corporation
*6: Polyarylate, manufactured by Unitika Ltd.
*7: Calcium Phosphate, manufactured by Maruo Calcium CO., LTD.
*8: Phosphite based anti-oxidant, manufactured by Adeka Corporation

TABLE 2

|   |   | Example |   |   |   |   |   |   |   | Comparative Example |   |   |
|---|---|---|---|---|---|---|---|---|---|---|---|---|
|   |   | 1 | 2 | 3 | 4 | 5 | 6 | 7 | 8 | 1 | 2 | 3 |
| Size (dtex) |   | 64 | 66 | 64 | 65 | 63 | 66 | 64 | 65 | 64 | 66 | 65 |
| Strength (cN/dtex) |   | 2.3 | 2.2 | 2.2 | 2.0 | 2.0 | 1.9 | 2.3 | 2.2 | 2.5 | 1.5 | 1.3 |
| Elongation (%) |   | 51 | 45 | 48 | 56 | 53 | 51 | 56 | 60 | 68 | 32 | 29 |
| Gloss |   | Bad | Good | Bad | Bad | Good | Bad | Good | Good | Bad | Bad | Bad |
| Transparency |   | Good | Good | Good | Good | Good | Good | Good | Good | Good | Bad | Bad |
| Touch feeling (Sticky feeling) |   | Good | Good | Good | Good | Good | Good | Good | Good | Good | Bad | Fair |
| Frame retardance | Flammability | Excellent | Excellent | Excellent | Excellent | Excellent | Excellent | Excellent | Excellent | Bad | Excellent | Good |
|   | LOI | 32 | 32 | 30 | 31 | 31 | 30 | 32 | 31 | 23 | 35 | 28 |
| Iron setting properties (180° C.) | Adhesion | Good | Good | Good | Good | Good | Good | Good | Good | Good | Fair | Fair |
|   | Shrinkage/thread breakage | Good | Good | Good | Good | Good | Good | Good | Good | Good | Good | Good |
|   | Rod withdrawal | Good | Good | Good | Good | Good | Good | Good | Good | Good | Fair | Fair |
|   | Curl holding | Good | Good | Good | Good | Good | Good | Good | Good | Good | Fair | Fair |

As shown in Table 2, excellent gloss, transparency, touch feeling and iron setting properties were observed in the Examples when compared to the Comparative Examples. It is also observed that excellent flame-retardancy can be obtained when using a specific bromine based flame-retardant in combination with a specific phosphorus based flame-retardant.

Accordingly, it was confirmed that the present artificial hair using a specific bromine based flame-retardant in combination with a specific phosphorus based flame-retardant can be utilized effectively for an artificial hair which maintains mechanical and thermal properties of polyester and has improved gloss, transparency, touch feeling and iron setting properties compared with conventional artificial hair.

INDUSTRIAL APPLICABILITY

According to the present invention, it is possible to provide a flame retardant polyester based artificial hair which has an excellent setting properties, touch feeling, transparency and further has an excellent flame-retardance and controlled gloss of fiber surface while maintaining fiber properties possessed by a polyester such as heat resistance, strength and elongation and the like.

What is claimed is:

1. A flame retardant polyester based artificial hair, formed from a composition comprising:
   (A) at least one polyester selected from a polyalkylene terephthalate and/or a copolymer comprising polyalkylene terephthalate as a main component,
   (B) at least one bromine containing flame retardant selected from the group consisting of a brominated epoxy based flame-retardant, a brominated phenoxy resin based flame-retardant and a brominated phosphate based flame-retardant and
   (C) a phosphorus compound selected from an organic cyclic phosphorus compound and/or a phosphoric ester amide compound, where the composition is obtained by melt kneading 100 parts by weight the polyester (A) and 5 to 30 parts by weight of a mixture of bromine containing flame-retardant (B) and the phosphorus compound (C) is 90/10 to 10/90,
   wherein the phosphorus compound (C) is 10-benzyl-9,10-di-hydro-9-oxa-10-phosphaphenanthrene-10-oxide represented by formula (I).

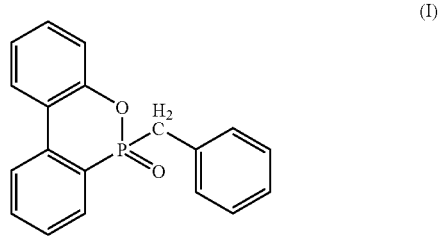

(I)

2. The flame retardant polyester based artificial hair according to claim 1, wherein the polyalkylene terephthalate is at least one member selected from the group consisting of polyethylene terephthalate, polypropylene terephthalate, and polybutylene terephthalate.

3. The flame retardant polyester based artificial hair according to claim 1, wherein the flame-retardant (B) is at least one compound represented by formulae (1) to (4):

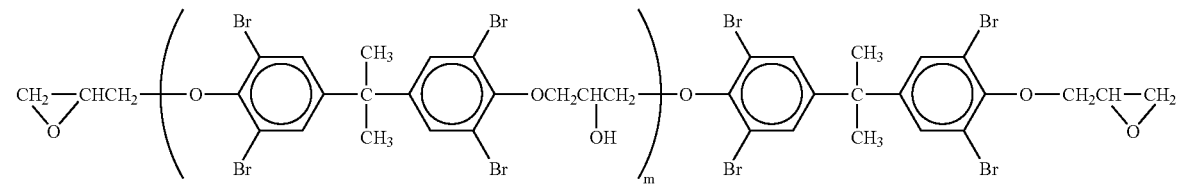

1 wherein m represents an integer of 0 to 100;

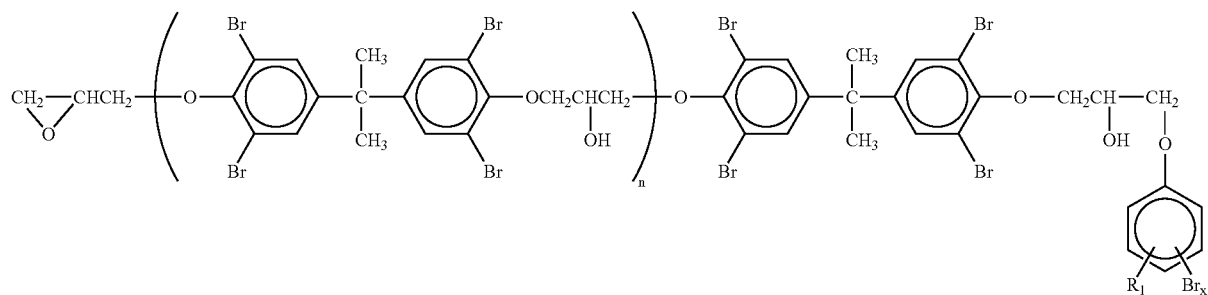

2 wherein $R^1$ represents alkyl group having 1-10 carbon atoms, n represents an integer of 0 to 100 and x represents an integer of 0 to 5;

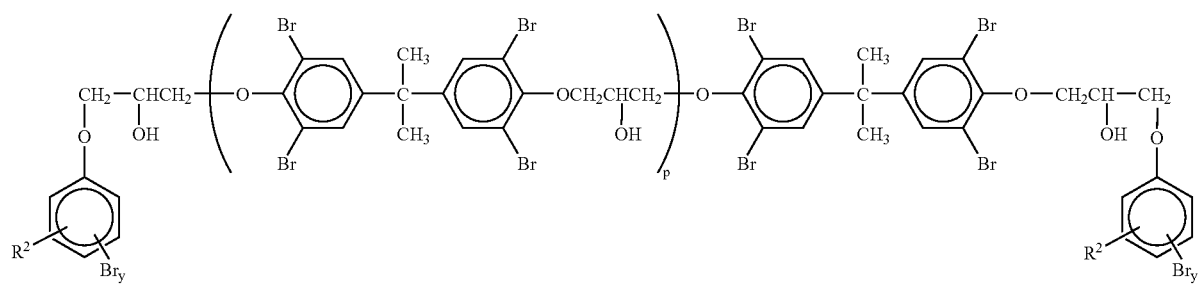

3 wherein $R^2$ represents alkyl group having 1-10 carbon atoms, p represents an integer of 0 to 100 and y represents an integer of 0 to 5;

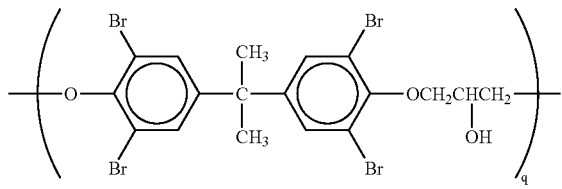

wherein q represents an integer of 80 to 200.

4. The flame retardant polyester based artificial hair of claim 1, wherein the flame-retardant (B) is at least one brominated phosphate ester selected from the group consisting of tris(bromoethyl)phosphate, tris(bromopropyl)phosphate, tris(dibromopropyl)phosphate, tris(bromobutyl)phosphate, tris(dibromobutyl)phosphate, tris(bromoneopentyl)phosphate, tris(dibromoneopentyl)phosphate and tris(tribromoneopentyl)phosphate.

5. The flame retardant polyester based artificial hair according to claim 1, which further comprises organic fine particles (D) and/or inorganic fine particles (E).

6. The flame retardant polyester based artificial hair according to claim 5, wherein the organic fine particles (D) are composed of at least one member selected from the group consisting of a polyarylate, polyamide, fluoro-resin, silicone resin, cross-linked acrylic resin, and a cross-linked polystyrene.

7. The flame retardant polyester based artificial hair according to claim 5, wherein the inorganic fine particles (E) are composed of at least one member selected from the group consisting of antimony trioxide, antimony pentoxide, sodium antimonate, calcium carbonate, silicon oxide, titanium oxide, aluminum oxide, zinc oxide, talc, kaolin, montmorillonite, bentonite, and mica.

8. The flame retardant polyester based artificial hair according to claim 1, which is in the form of a non-crimped fiber.

9. The flame retardant polyester based artificial hair according to claim 1, which is spun dyed.

10. The flame retardant polyester based artificial hair according to claim 1, which has a monofilament size of 10 to 100 dtex.

11. The flame retardant polyester based artificial hair according to claim 1, wherein the flame-retardant (B) is at least one compound selected from the group consisting of a compound of formula (1) wherein m represents an integer of 0 to 15, a compound of formula (2) wherein n represents an integer of 0 to 30 and x represents an integer of 0 to 3, a compound of formula (3) wherein p represents an integer of 0 to 5 and y represents an integer of 0 to 3, and a compound of formula (4).

* * * * *